(12) United States Patent
Cho

(10) Patent No.: US 10,715,722 B2
(45) Date of Patent: Jul. 14, 2020

(54) DISPLAY DEVICE, METHOD OF CONTROLLING THEREOF AND DISPLAY SYSTEM

(71) Applicant: SAMSUNG ELECTRONICS CO., LTD., Suwon-si (KR)

(72) Inventor: Yun-seong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/650,431

(22) Filed: Jul. 14, 2017

(65) Prior Publication Data

US 2018/0027175 A1    Jan. 25, 2018

(30) Foreign Application Priority Data

Jul. 19, 2016  (KR) .................. 10-2016-0091238
Jul. 7, 2017   (KR) .................. 10-2017-0086417

(51) Int. Cl.
*H04N 5/232*   (2006.01)
*G09G 5/14*    (2006.01)
*G06F 3/14*    (2006.01)
*G01C 11/02*   (2006.01)
(Continued)

(52) U.S. Cl.
CPC ......... *H04N 5/23219* (2013.01); *G01C 11/02* (2013.01); *G01C 21/3661* (2013.01); *G01C 21/3688* (2013.01); *G06F 3/1446* (2013.01); *G09G 5/14* (2013.01); *H04N 5/23229* (2013.01); *H04N 5/2621* (2013.01); *H04N 5/2622* (2013.01); *G06F 3/1454* (2013.01); *G09G 2300/026* (2013.01);
(Continued)

(58) Field of Classification Search
CPC .................................. H04N 5/23219
USPC ......................................... 348/584
See application file for complete search history.

(56) References Cited

U.S. PATENT DOCUMENTS 8,789,131 B2 *  7/2014  Choi ............... G06F 3/04883
                                                       725/148
2007/0109833 A1  5/2007  Pyeon et al.
2010/0306798 A1  12/2010  Ahn et al.
(Continued)

FOREIGN PATENT DOCUMENTS

JP       4878060 B2     2/2012
JP       2012-48597     3/2012
(Continued)

OTHER PUBLICATIONS

Extended European Search Report dated Dec. 13, 2017 in European Patent Application No. 17181738.0.
(Continued)

*Primary Examiner* — Jefferey F Harold
*Assistant Examiner* — Justin B Sanders
(74) *Attorney, Agent, or Firm* — Staas & Halsey LLP

(57) ABSTRACT

A display device is disclosed. The display device according to various exemplary embodiments includes a display, a communicator configured to communicate with an external device, a first nearby device, and a second nearby device, and a processor configured to control the communicator to transmit each of a first image which is received from the external device and a second image which is received from the first nearby device to the second nearby device, and control the display to display at least one of the first image and the second image.

12 Claims, 14 Drawing Sheets

(51) Int. Cl.
*G01C 21/36* (2006.01)
*H04N 5/262* (2006.01)
(52) U.S. Cl.
CPC ..... *G09G 2354/00* (2013.01); *G09G 2356/00* (2013.01); *G09G 2370/20* (2013.01)

(56) References Cited

U.S. PATENT DOCUMENTS

| | | |
|---|---|---|
| 2011/0119592 A1 | 5/2011 | Tada |
| 2012/0242893 A1 | 9/2012 | Akitomo |
| 2013/0081083 A1* | 3/2013 | Yu ................. H04L 12/2812 725/40 |
| 2013/0194305 A1 | 8/2013 | Kakuta et al. |
| 2014/0025847 A1 | 1/2014 | Choi et al. |
| 2014/0306865 A1 | 10/2014 | Pan et al. |
| 2015/0062433 A1 | 3/2015 | Wang et al. |
| 2015/0172594 A1* | 6/2015 | Takada ................ G06F 3/1446 386/219 |
| 2015/0287390 A1 | 10/2015 | Kakeko |
| 2016/0034239 A1* | 2/2016 | Choi ..................... G06F 3/1423 345/1.3 |
| 2016/0085497 A1 | 3/2016 | Kim |
| 2016/0132280 A1* | 5/2016 | Tomonaga ........... G06F 3/1438 345/502 |
| 2017/0277902 A1 | 9/2017 | Bae et al. |

FOREIGN PATENT DOCUMENTS

| | | |
|---|---|---|
| KR | 10-2013-0093853 A | 8/2013 |
| KR | 10-1405943 B1 | 6/2014 |
| KR | 10-15747076 B1 | 8/2015 |
| KR | 10-2016-0029551 | 3/2016 |

OTHER PUBLICATIONS

International Search Report dated Nov. 29, 2017 in International Patent Application No. PCT/KR2017/007598.
European Communication dated Apr. 24, 2019 in European Patent Application No. 17181738.0.

* cited by examiner

DISPLAY DEVICE, METHOD OF CONTROLLING THEREOF AND DISPLAY SYSTEM

CROSS-REFERENCE TO RELATED APPLICATIONS

This application claims the benefit of priority from Korean Patent Application No. 10-2016-0091238, filed on Jul. 19, 2016, and Korean Patent Application No. 10-2017-0086417, filed on Jul. 7, 2017, in the Korean Intellectual Property Office, the disclosure of which is incorporated herein by reference in its entirety.

BACKGROUND OF THE INVENTION

1. Field of the Invention

The present general inventive concept generally relates to a display device, a control method thereof, and display system, and more particularly, to a display device that changes a data source without resetting a connection of a plurality of display devices, a method for controlling thereof and display system.

2. Description of the Related Art

A display system consisting of a plurality of display devices is commonly used in a field of advertisement, entertainment, sports, or broadcasting and displays an image by using the plurality of display devices.

For example, the display system consisting of a plurality of display devices may be used in an exhibition or the like. The respective display devices of the display system display the same image at the same time or display different images to express one whole image.

In this case, an external device connected to one of the display devices performs a function of a data source for providing an image.

When a user wishes to change the data source to an external device connected to another display device, the user is inconvenienced by resetting a connection of the plurality of display devices.

Accordingly, there is a need for a method for changing a display device to which a data source is connected without resetting a connection of a plurality of display devices of a display system.

SUMMARY OF THE INVENTION

The present disclosure has been provided to address the aforementioned and other problems and disadvantages occurring in the related art, and an aspect of the present disclosure provides a display system that changes a display device to which a data source is connected without resetting a connection of a plurality of display devices of the display system, the display devices of the display system, and a method for controlling the same.

According to an exemplary embodiment, a display device is disclosed. The display device includes a display, a communicator configured to communicate with an external device, a first nearby device, and a second nearby device, and a processor configured to control the communicator to transmit each of a first image which is received from the external device and a second image which is received from the first nearby device to the second nearby device, and control the display to display at least one of the first image and the second image.

The communicator may receive device information on the external device from the external device and receive device information on a second external device corresponding to the second image from the first nearby device, and the processor may generate an image source list using the received device information of the external device and the device information of the second external device, and control the display to display the generated image source list.

The device further includes an input unit to receive a control command to select an image source, and the processor, in response to a control command to select the external device as an image source being received, may control the display to display the first image, and in response to a control command to select the second external device as an image source being received, controls the display to display the second image.

The processor may control the display to display a predetermined area out of the received first image or second image based on a position of the display device, the first nearby device and the second nearby device.

The processor may synthesize the first image and the second image to generate a synthesized image, and control the communicator to transmit the synthesized image to the second nearby device.

The device may further include an input unit configured to receive a control command to select a part of an area which is to be displayed in the display from the synthesized image, and the processor may control the display to display only a part of an area corresponding to the control command from the synthesized image.

The communicator may receive, from the first nearby device, a control command regarding the display device, and the processor may perform an operation corresponding to the received control command.

The communicator may receive, from the first nearby device, a control command regarding the second nearby device and transmit the received control command to the second nearby device.

A control method of a display device according to an exemplary embodiment includes connecting with a first nearby device and a second nearby device, connecting with an external device, transmitting each of a first image received from the external device and a second image received from the first nearby device to the second nearby device, and displaying at least one of the first image and the second image.

The method may further include receiving device information of the external device from the external device, receiving device information on the second external device corresponding to the second image from the first nearby device, generating an image source list using the received device information of the external device and the device information of the second external device, and displaying the generated image source list.

The method may further include receiving a control command to select an image source, and the displaying may include, in response to a control command to select the external device as an image source being received, displaying the first image, and in response to a control command to select the second external device as an image source being received, displaying the second image.

The displaying may include displaying a predetermined area out of the received first image or second image based on a position of the display device, the first nearby device and the second nearby device.

The method may further include synthesizing the first image and the second image to generate a synthesized image, and transmitting the synthesized image to the second nearby device.

The method may further include receiving a control command to select a part of an area which is to be displayed in the display device from the synthesized image, and the displaying may include displaying only a part of an area corresponding to the control command from the synthesized image.

The method may further include receiving, from the first nearby device, a control command regarding the display device, and performing an operation corresponding to the received control command.

The method may further include receiving, from the first nearby device, a control command regarding the second nearby device, and transmitting the received control command regarding the second nearby device to the second nearby device.

A display system according to an exemplary embodiment includes an external device which provides a content and a plurality of display devices, and the display device which is connected to the external device, from among the plurality of display devices transmits a first image received from the external device and a second image received from another display device respectively to other display devices, and display at least one of the first image and the second image.

In this case, each of the plurality of display devices may be connected to each of two adjacent other devices via wired cable.

The system further includes a second external device which is connected to the different display device, and the display device connected to the external device may receive device information of the external device from the external device, receive device information of the second external device from the second display device, generate an image source list using the received device information of the external device and device information of the second external device, and display the generated image source list.

The display device connected to the external device may synthesize the first image and the second image to generate a synthesized image and transmit the synthesized image to the different display device.

BRIEF DESCRIPTION OF DRAWINGS

The above and/or other aspects of the present inventive concept will be more apparent by describing certain embodiments of the present inventive concept with reference to the accompanying drawings, in which.

DETAILED DESCRIPTION OF PREFERRED EMBODIMENT

Certain embodiments are described below in greater detail with reference to the accompanying drawings. The present disclosure may have several embodiments, and the embodiments may be modified variously. In the following description, specific embodiments are provided with accompanying drawings and detailed descriptions thereof. However, it should be noted that the embodiments do not limit the scope of the invention of the present disclosure to any particular embodiment and include all modifications, equivalents, and/or replacements that belong to the range of a technical concept and a technical scope disclosed herein. When it is determined that a detailed description on a publicly-known related art may obscure the gist of the present disclosure unnecessarily, the detailed description will be omitted.

In the following description, a term including an ordinal, for example, 'first' or 'second,' may be used to distinguish elements, but the elements are not limited by the ordinal. The ordinal is used to only distinguish the same or similar elements.

The terms used in the following description are provided to describe a specific exemplary embodiment and are not intended to limit the scope of right of the present disclosure. In the following description, a term 'include' or 'consist of' refers to the disclosed features, numbers, steps, operations, elements, parts, or combinations thereof and is not intended to exclude any possibilities of existence or addition of one or more other features, numbers, steps, operations, elements, parts, or combinations thereof.

In the embodiments disclosed herein, a term 'module' or 'unit' refers to an element that performs at least one function or operation. The 'module' or 'unit' may be realized as hardware, software, or combinations thereof. A plurality of 'modules' or 'units' may be integrated into at least one module or chip and realized as at least one processor (not shown), except for a case where respective 'modules' or 'units' need to be realized as discrete specific hardware.

Figure 1:
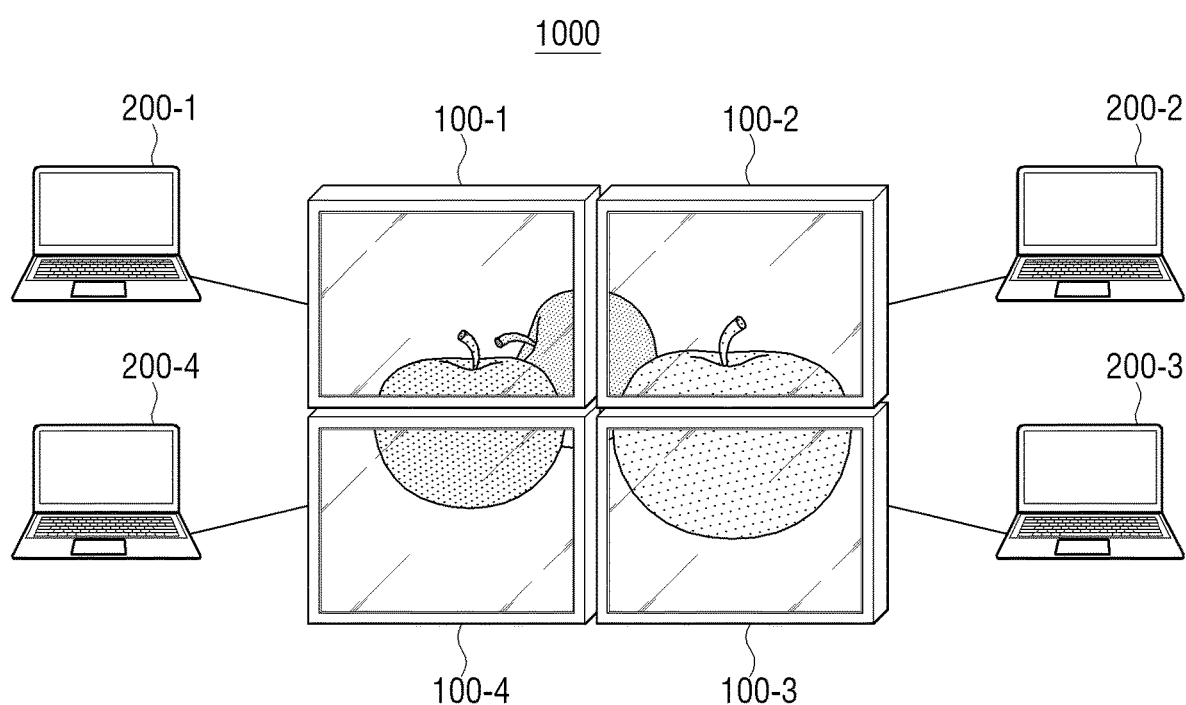
FIGS. 1 to 3 are diagrams provided to describe a display system consisting of a plurality of display devices according to an embodiment disclosed herein.

FIG. 1 is a diagram illustrating a display system 1000 consisting of a plurality of display devices and a plurality of external devices respectively connected to the plurality of display devices according to an embodiment disclosed herein.

The display system 1000 may be configured by a display device, an external device connected to the display device, and a plurality of nearby devices connected to the display device. Here, the external device may be a device that stores or provides contents to the display device. For example, the external device may be a notebook, a smart phone, a set-top box, an external memory (USB, SD card, etc.). The plurality of nearby devices may be the same kind or different kinds of display devices as the display device. At this time, the communication lines connecting the plurality of nearby devices and the display device are connected in a closed loop manner, and the contents received from the external device can be sequentially transceived according to the communication line connection order. A plurality of nearby devices can also be respectively connected to a plurality of external devices.

Referring to FIG. 1, the display system 1000 may include a plurality of display devices 100-1, 100-2, 100-3, 100-4 and a plurality of external devices 200-1, 200-2, 200-3, 200-4 respectively connected to the plurality of display devices. The respective display devices of the display system 1000 may display the same image at the same time or display divided images to express one whole image. In the meantime, FIG. 1 illustrates that a plurality of display devices 100-1, 100-2, 100-3, and 100-4 are respectively connected to one external device each, but two or more external devices may be connected to one display device, and a display device not connected to an external device may be included.

FIG. 1 illustrates an example where four display devices 100-1, 100-2, 100-3, 100-4 display divided images of an image of apples at the same time. A source of each image displayed in the four display devices 100-1, 100-2, 100-3, 100-4 is any one of four external devices 200-1, 200-2, 200-3, 200-4 respectively connected to the four display devices 100-1, 100-2, 100-3, 100-4.

For example, the first display device 100-1 may receive the image of apples from the connected first external device 200-1 and transmit the received image to the second, third, and fourth display devices 100-2, 100-3, 100-4 so that the received image is displayed in the four display devices 100-1, 100-2, 100-3, 100-4. In this case, the first external device 200-1 performs a function of an image source, the first display device 100-1 connected to the first external device 200-1 may be called 'host device.' The second, third, and fourth display devices 100-2, 100-3, 100-4 that receive and display the image from the first display device 100-1 may be called 'slave device.'

In the above embodiment, the first external device 200-1 is an image source, but this is an example for convenience in explanation. In the implementation, at least one of the second to fourth external devices 200-2 to 200-4 may be realized so as to perform a function of an image source, as well as the first external device 200-1.

Further, in the above embodiment, the display system 1000 includes four display devices, but this is an example for convenience in explanation. In the implementation, the display system 1000 may include any number of display devices.

Figure 2:
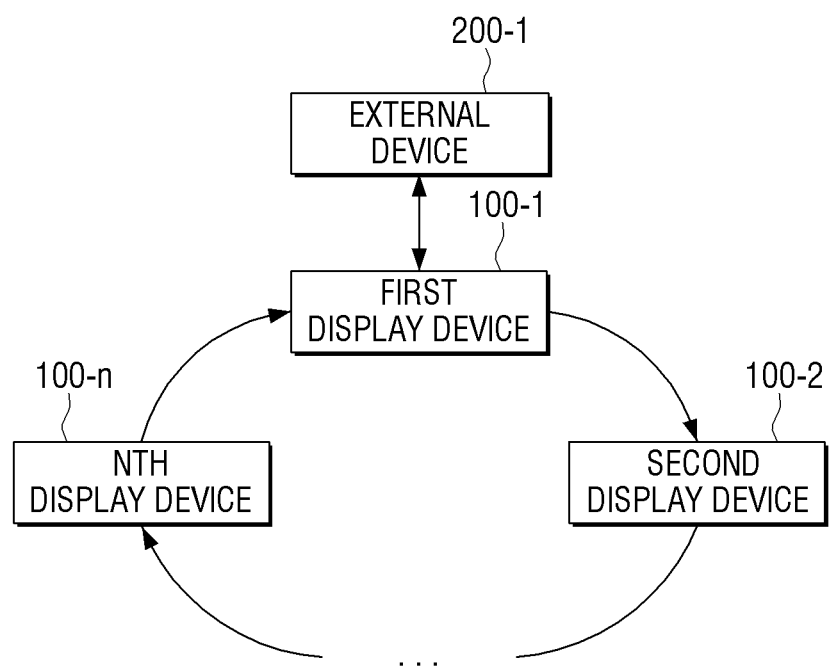
Figure 3:
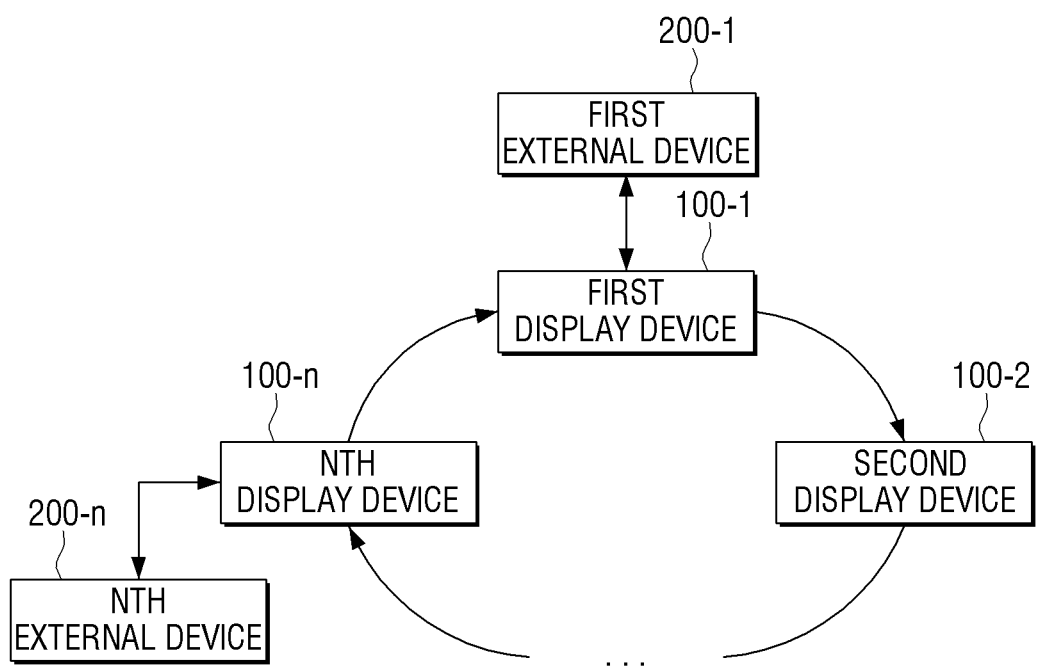

FIG. 2 and FIG. 3 are block diagrams conceptually illustrating a display system consisting of a plurality of display devices according to an embodiment disclosed herein. To be specific, FIG. 2 is a block diagram showing an exemplary embodiment that an external device 200-1 is connected to one of the first through nth display devices 100-1, 100-2, . . . , 100-n constituting the display system 1000-1 according to the embodiment of the present disclosure. FIG. 3 is a block diagram illustrating an exemplary embodiment that the external device 200-1, 200-n is connected to a plurality of display devices from among the first to nth display devices 100-1, 100-2, . . . , 100-n constituting the display system 1000-2 according to an exemplary embodiment.

Referring to FIG. 2, anyone of the first to nth display devices 100-1, 100-2, . . . , and 100-n constituting the display system 1000-1 may be connected to the external device 200-1. At this time, the external device 200-1 may serve as a data source for providing an image to the first display device 100-1 connected thereto. Specifically, the data source may be an image source for an image to be displayed on the display device. By way of example, the plurality of external devices may be a laptop Personal Computer (PC), a smart phone, a set-top box, an external memory (Universal Serial Bus (USB) or Secure Digital (SD) card) or the like. In the above embodiment, one external device is connected to one display device, but in the implementation, two or more external devices may be connected to one display device.

To be specific, the external device 200-1 may be connected to a connecting port of the display device 100-1 in a wired manner. The connection port of the display devices may be at least one of High Definition Multimedia Interface (HDMI), Digital Visual Interface (DVI), Red Green Blue (RGB), DSUB, Super Video (S-Video), Component Video, and Composite Video. The external devices may be also connected in a wireless manner.

The plurality of display devices of the display system 1000-1 may be connected to each other in form of a closed-loop to transmit and/or receive various data, commands, and contents sequentially according to a preset connection order. The plurality of display devices are respectively connected to two adjacent different display devices. When connected via a wired cable, the plurality of display devices can be connected in a circular shape. To be specific, a display device may receive an image from one other display device among the plurality of other display devices or transmit the received data to another other display device among the plurality of other display devices.

Referring to a connection state illustrated in FIG. 2, the first display device 100-1 is connected to the nth display device 100-n indirectly, for example. That is, when the first display device 100-1 transmits the data to the nth display device 100-n, the data may be transmitted to the nth display device 100-n via the second display device 100-2.

For instance, in response to the first display device 100-1 being connected to the external device 200-1, the first display device 100-1 may transmit information on the connected first external device 200-1 to the second display device 100-2. In this case, the information on the external device may be device information include a type of the external device, a model name of the external device, or a type of the connection port.

In the meantime, the second display device 100-2 can transmit information of the external device 200-1 received from the first display device 100-1 to the nth display device 100-n. The nth display device 100-n can transmit the received information of the external device 200-1 to the first display device 100-1.

Here, the second display device 100-2 and the nth display device 100-n may be directly or indirectly connected, and when the second display device 100-2 is indirectly connected, at least one display device can be further connected between the second display device 100-2 and the nth display device 100-n.

As described above, the information on the external devices connected to the other display devices may be transmitted in one direction within the circular closed-loop of the plurality of display devices. Accordingly, the plurality of display devices may share the information on the connected external devices.

As the plurality of display devices share the information on the connected external devices, a user may select an external device to perform a function of an image source for providing an image from among the plurality of external devices by using any one of the plurality of display devices. As described above, when a plurality of display devices mutually share information of an external device connected to the other display device, a user may select one of the plurality of display devices so that an image displayed from the connected external device can be displayed.

The external device 200-1 may transmit an image to the connected display device. The image transmitted from the external device to the display device may be transmitted in one direction in the circular closed-loop of the plurality of display devices, in the same manner that the first to nth display devices 100-1, 100-2, ..., 100-n share the information on the external device 200-1 described above. Accordingly, the first to nth display devices 100-1, 100-2, ..., 100-n may share the image.

The display device connected to the external device determined as the image source for providing an image may transmit the image received from each of the connected external device to other display device. For example, each of the plurality of display devices may transmit the received image or data corresponding to the image to other display device through the connection port.

As described above, the first to nth display devices 100-1, 100-2, ..., 100-n may share the same image and display the shared image, respectively. The display system 1000-1 according to an embodiment disclosed herein may divide the image into a plurality of areas based on positions of the first to nth display devices 100-1, 100-2, ..., 100-n. Each display device may display a divided image of an area corresponding to the position of the display device. The divided images may form one whole image.

In the above embodiment, the first to nth display devices 100-1, 100-2, ..., 100-n display the same image, but this is an example. The respective display devices may display different images or display the image received from the external device connected to other display device. This operation will be described below in greater detail with reference to FIGS. 7 to 11.

A control command for controlling at least one of the first to nth display devices 100-1, 100-2, ..., 100-n may be received from the external device determined as the image source along with the image and shared by the first to fourth display devices 100-1, 100-2, 100-3, 100-4. This operation will be described below in greater detail with reference to FIG. 12.

In FIG. 2, each display device is connected to an adjacent other display device directly, and the data is transmitted with a direction, but according to various embodiments disclosed herein, the connection form is not limited thereto. As an example, each display device may be connected to all of the other display devices directly and may be connected so as to transmit the data in both directions.

In addition, FIG. 2 illustrates the connection of the display devices in a form of one line, but the connection may be realized as two or more communication paths. Further, the communication may be performed according to a wireless communication method, not a wired method.

Referring to FIG. 3, the first to nth display devices 100-1, 100-2, ..., 100-n constituting the display system 1000-2 according to an embodiment of the present disclosure may be connected to a plurality of external devices 200-1, ..., 200-n, respectively. Specifically, the first to nth display devices 100-1, 100-2, ..., 100-n may include not only a display device connected to an external device but also a display device not connected to an external device. The plurality of external devices 200-1 to 200-n may serve as a data source for providing images to the plurality of display devices 100-1 to 100-n, respectively. Specifically, the data source may be an image source for an image to be displayed on a display device. For example, the plurality of external devices may be a notebook, a smart phone, a set-top box, an external memory (USB, SD card, etc.), and the like. In the above description, it is described that one external device is connected to one display device. However, in actual implementation, two or more external devices may be connected to one display device.

To be specific, the plurality of external devices 200-1, ..., 200-n can be connected to a connection port provided on the first to nth display devices 100-1, ..., 100-n in a wired manner. At this time, the connection port which is provided on the display device may be at least one of high definition multimedia interface (HDMI), digital visual interface (DVI), red green blue (RGB), DSUB, super video (S-Video), component Video, and composite video. The connection can be made in wireless manner as well.

The plurality of display devices constituting the display system 1000-2 can be connected in a closed-loop type. Regarding the above, it has been described in FIG. 2 and will not be further described.

According to the connection state shown in FIG. 2, for example, the first display device 100-1 is indirectly connected to the nth display device 100-n. That is, if data is to be transmitted from the first display device 100-1 to the nth display device 100-n, the data is transmitted to the nth display device 100-n through the second display device 100-2.

For example, when the first display device is connected to the first external device 200-1, the first display device 100-1 may transmit information of the connected first external device 200-1 to the second display device 100-2. At this time, information of the external device may include types of an external device, a model name of an external device, and types of a connection port, or the like.

In the meantime, the second display device 100-2 which is not connected to the external device may transmit information of the first external device 200-1 which is received from the first display device 100-1 to the nth display device 100-n as well.

In the actual implementation, the second display device 100-2 may be connected to the second external device. In this case, the second display device 100-2, which is connected to the second external device, may transmit the information of the second external device and the information of the first external device 200-1 received from the first display device 100-1 together to the nth display device 100-n.

Here, the second display device 100-2 and the nth display device 100-n may be indirectly or directly connected. When indirectly connected, at least one display device may be further included between the second display device 100-2 and the nth display device 100-n.

The nth display device 100-n connected to the nth external device 200-n may transmit the received information of the first external device 200-1 and the nth external device 200-n to the first display device 100-1. At this time, the information of the first external device 200-1 and the information of the nth external device 200-n may be transmitted simultaneously or in any order.

On the other hand, the first display device 100-1 may transmit the information of the first external device 200-1 received from the first external device 200-1 and the information of the nth external device 200-n received from the nth display device 100-n to the second display device 100-2. By the above, the second display device 100-2 can also share information about the nth external device 200-n connected to the nth display device 100-n.

As described above, information of an external device which is connected to each display device is transmitted with directional nature so that the information is transmitted among a plurality of display devices connected in circular closed-loop shape is transmitted in direction, a plurality of display devices may mutually share information of the connected external device.

As described above, when a plurality of display devices mutually share the information of the external devices connected to each other, a user can use any one of the plurality of display devices and select an external device which will function as an image source providing an image.

Specifically, the display system 1000-2 may display a plurality of image source lists which are generated based on information of the mutually-shared first to nth external devices 200-2, . . . 200-n on at least one of the first to nth display devices (100-1, 100-2, . . . , 100-n), and receive selection of an external device for providing an image from a user. The UI for displaying a plurality of external device lists will be described in detail with reference to FIG. 7.

However, the present invention is not limited thereto, and if a user is using any external device from among a plurality of external devices 200-1 to 200-n which are respectively connected to the first to nth display devices 100-1 to 100-n, the external device may be implemented in various ways such as determining the external device being used as an external device that provides the image, and so on.

In the meantime, one external device which is decided as an external device for providing an image from among the plurality of external devices 200-1 . . . 200-1n may provide an image to the connected display device. At this time, the image transmitted from the external device to the display device may be transmitted with directional nature so that the image is transmitted in one direction among a plurality of display devices connected in a circular closed-loop shape, in the same manner as that the first to nth display devices (100-1, 100-1, . . . 100-n) mutually share information on the plurality of external devices 200-1, . . . , 200-n, and the image can be mutually shared in the first to nth display devices 100-1, 100-2, . . . , 100-n.

Meanwhile, an external device for providing an image may be at least one of a plurality of external devices 200-1 to 200-n, and each display device which is connected to the external device that is decided as an image source providing an image may transmit an image received from each external device to other display device. For example, each of the plurality of display devices may transmit received image or data corresponding to the received image to the other display device through the connection port.

As described above, the first to nth display devices 100-1, 100-2, . . . , 100-n may share the same image and display the shared image. In the meantime, the display system 1000-2 according to an exemplary embodiment of the present disclosure may divide an image into a plurality of areas based on a position of the first to nth display devices 100-1, 100-2, . . . , 100-n, and each display device may display the divided images of the area corresponding to the position of each display device. When the displayed images are combined, one entire image can be configured.

While the first to nth display devices 100-1, 100-2, . . . , 100-n have been described as displaying the same image in the above description, but each display device may display different images and display an image received from an external device connected to another display device. This will be described below in further detail with reference to FIGS. 7 to 11.

Meanwhile, a control command for controlling at least one of the first to nth display devices 100-1, 100-2, . . . , 100-n is received from an external device determined as an image source and be shared among the first to nth display devices 100-1, 100-2, . . . , 100-n. This will be described in detail with reference to FIG. 12.

In FIG. 3, each of the display devices is directly connected to an adjacent display device and is connected to transmit data in a directional manner. However, according to various embodiments of the present disclosure, the connection mode is not limited thereto. For example, each display device may be directly connected to all of the other display devices, and may be connected to transmit data in both directions.

In FIG. 3, display devices are illustrated in one line, but the devices can be implemented as two or more communication paths. In addition, communication can be performed in a wireless manner instead of a wired manner.

Figure 4:
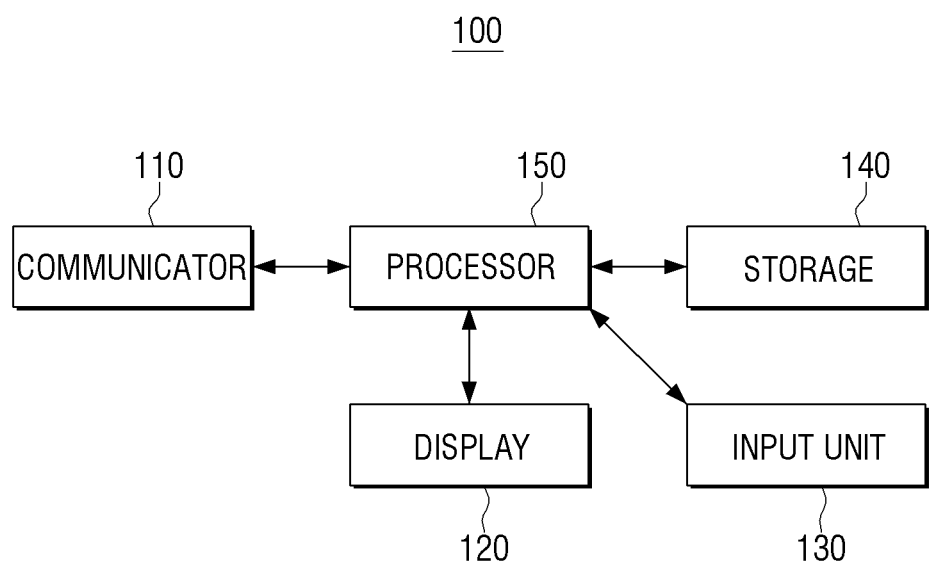
FIG. 4 is a block diagram illustrating a structure of an display device of a display system according to an embodiment disclosed herein.

FIG. 4 is a block diagram illustrating a structure of a display device of a display system according to an embodiment disclosed herein.

Referring to FIG. 4, a display device 100 includes a communicator 110, a display 120, an input unit 130, a storage 140, and a processor 150.

The communicator 110 performs communication between the display device 100 and an external device. The communicator 110 may perform the communication in a wired manner using a connection port of the display device 100, for example, at least one of HDMI, DVI, RGB, DSUB, S-Video, Component Video, and Composite Video or in a wireless manner such as Global System for Mobile Communication (GSM), Universal Mobile Telecommunications System (UMTS), Long Term Evolution (LTE), Wireless Broadband Internet (WiBRO), Wireless-Fidelity (Wi-Fi), Bluetooth, or the like.

To be specific, the communicator 110 may communicate with an external device providing the display device 100 with an image. In response to the external device being connected to the display device 100, the communicator 110 may receive information on the connected external device from the external device. In response to the external device connected to the display device 100 being determined as an external device to perform a function of an image source for providing an image, the communicator 110 may receive an image from the external device. In this case, the communicator 110 may receive the image or data corresponding to the image from the external device. Further, the communicator 110 may receive a control command for controlling at least one of a plurality of display devices of the display system according to an embodiment disclosed herein, along with the image received through the communicator 110 from the external device.

The communicator 110 may communicate with other display device of the display system according to an embodiment disclosed herein. To be specific, the communicator 110 may transmit the information or the image of the external device received through the communicator 110 from the external device to other display device. Further, the communicator 110 may receive an image from other display device. The received image may have been transmitted from an external device connected to other display device to the other display device.

In response to the external device for providing an image being determined, the communicator 110 may change a device for transmission and/or reception of an image according to the information on the determined external device. To be specific, in response to the external device connected to the display device 100 being determined as the image source, the communicator 110 may transmit the data received through the communicator 110 to another other display device that is different from one other display device that transmitted the information on the external device to the display device 100, according to the information on the connected external device, so that the data is transmitted to the plurality of other display devices sequentially. Accordingly, the data or image is transmitted in one direction in the plurality of display devices.

In response to an external device connected to other display device being determined as the image source, the communicator 110 may receive an image from one other display device among the plurality of other display devices and transmit the received image to another other display device that is different from the other display device that transmitted the image. To be specific, the communicator 110 may transmit or may do not transmit the received image to another other display device among the plurality of other display devices according to a position of the display device 100 in the plurality of display devices. For instance, in response to the display device 100 not being arranged as the last in the order, the communicator 110 may transmit the image received from one other display device to another other display device. In response to the display device 100 being arranged as the last in the order, the communicator 110 does not need to transmit the image received from one other display device to another other display device.

The image transmitted to other display device or received from other display device through the communicator 110 may include an image to be displayed in the display, data corresponding to the image, and a synthesized image generated by synthesizing the images transmitted from the plurality of display devices of the display system. Further, a control command for controlling at least one of the plurality of display devices may be received along with the image.

The display 120 may display various images according to control of the processor 150. To be specific, the display 120 may display a list of selectable image sources generated by the processor 150. The user may select an external device to perform a function of an image source for providing an image to be displayed from the list of the selectable image sources displayed in the display 120, by using the input unit 160.

The display 120 may display the image provided from the selected image source. To be specific, in response to the image source being the external device connected to the display device 100, the display 120 may display the image received through the communication 110. In response to the image source being the external device connected to other display device, the display 120 may display the image received through the communication 110 from other display device. In this case, the display 120 may display only a predetermined area corresponding to a predetermined position of the display device 100.

The display 120 may display a synthesized image generated by synthesizing the images provided from the plurality of external devices of the display system according to an embodiment disclosed herein. Further, the display 120 may display only a part of the synthesized image. This operation will be described below in greater detail with reference to FIGS. 6 to 9.

The input unit 130 is a configuration to receive selection of a user, and receives a control command to select an image source to provide an image from among a plurality of image source list displayed in the display 120. For example, the input unit 130 may receive a user's selection through a remote control device, such as, a remote controller that communicates with the display device 100. In response to the display 120 being realized as a touch screen, the display 120 may receive a selection by a user's direct touch as a component of the display 120.

The storage 140 stores data. The storage 140 may store the information on the external device connected to the display device 100, the information on other external device received from other display device, the list of the selectable image sources generated based on the received information on the plurality of external devices, the image received from the external device determined as the image source for providing an image, a synthesized image generated by synthesizing the images provided from the plurality of external devices, or the like.

The processor 150 controls overall operations of the display device 100, controls a signal flow of the internal components 110 to 150, and processes data. The processor 150 may include a Read-Only Memory (ROM) that stores a control program for controlling the display device 100 and a Random Access Memory (RAM) that stores a signal or data inputted from outside of the display device 100 or is used as a storage area for diverse operations performed in the display device 100.

To be specific, the processor 150 may control the communicator 110 to receive the information on the plurality of external devices respectively connected to the plurality of display devices of the display system according to an embodiment disclosed herein. Further, the processor 150 generates the list of the selectable image sources based on the received information on the plurality of external devices. The processor 150 may control the display 120 to display the generated list.

The processor 150 may determine at least one external device for proving an image from among the plurality of external devices. In this case, the processor 150 may determine an external device selected by the user through the input unit 130 or an external device used by the user as the image source for providing an image.

The processor 150 may receive an image provided from the external device determined as the image source. To be specific, in response to the external device connected to the display device 100 being determined as the image source, the processor 150 may receive an image from the connected the external device through the communicator 110. In response to an external device connected to other display device being determined as the image source, the processor 150 may receive the data provided from the external device connected to other display device from the other display device through the communicator 110. In this case, the image received from the external device connected to the display device 100 may be called 'first image,' and the image received from other display device may be called 'second image.'

In response to the determined image source of the display device 100 being the external device connected to other display device, and the determined image source of other display device being the external device connected to the display device 100, the processor 150 may control the communicator 110 to receive the second image from one other display device among the plurality of other display devices and transmit the first image received from the connected external device to another other display device among the plurality of other display devices.

The processor 150 may transmit the received image to other display device through the communicator 110 so that the other display device displays the image. The other display device that received the image from the display device 100 may be at least one of the plurality of display devices of the display system according to an embodiment disclosed herein and may be different from the other display device that transmitted the data to the display device 100.

In this case, a control command for controlling at least one of the plurality of display devices of the display system according to an embodiment disclosed herein may be received and/or transmitted along with the data received from the external device or one other display device and the image transmitted to another other display device through the communicator 110. At this time, when the control command for the display device 100 is inputted, the processor 150 may perform an operation corresponding to the control command, and when receiving the control command for controlling the other display device, control the communicator 110 to transmit the received control command to one other display device from among the plurality of the other display devices.

As the plurality of display devices share the control command for controlling at least one of the plurality of display devices, other display device of the display system may be controlled in the display device 100 or in the external device connected to the display device 100, which may increase user convenience.

The processor 150 may control the display 120 to display the received image. The image displayed in the display 120 according to the control of the processor 150 may be a received image, an image that belongs to a predetermined area corresponding to the predetermined position of the respective display devices, an image generated by synthesizing the images provided from the plurality of external devices, and an image that belongs to a part of area of the synthesized image. In this case, an image generated by synthesizing the first image received from the external device and the second image received from one other display device may be called 'third image.'

As described above, as the plurality of display devices of the display system share the information on the plurality of connected external devices, it is possible to change an external device that performs a function of an image source without resetting the connection of the plurality of display devices.

Figure 5:
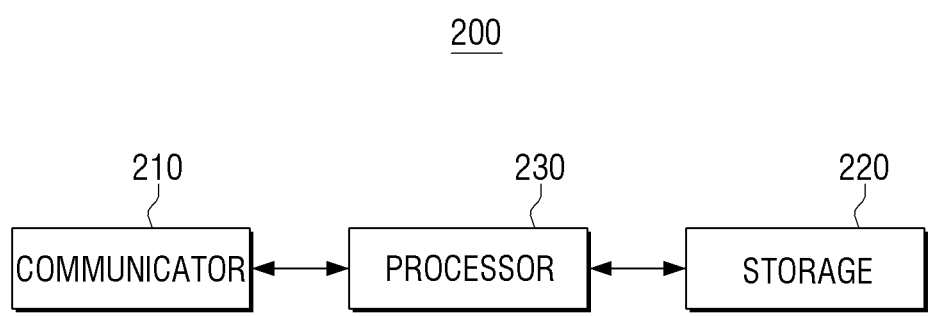
FIG. 5 is a block diagram illustrating a structure of an external device of a display system according to an embodiment disclosed herein.

FIG. 5 is a block diagram illustrating a structure of an external device of a display system according to an embodiment disclosed herein.

Referring to FIG. 5, an external device 200 includes a communicator 210, a storage 220, and a processor 230.

The communicator 210 performs communication between the external device 200 and a display device. To be specific, as described above in connection with FIG. 4, the communicator 210 may be connected to the display device in a wired and/or wireless manner. In response to the external device 200 being connected to the display device, the communication 210 may transmit information on the external device 200 to the display device.

In response to the external device 200 being determined as an image source for providing an image, the communicator 210 may transmit data stored in the storage 220 to the display device. The data may include at least one of an image to be displayed in the display device and a control command for controlling at least one of a plurality of display devices of the display system according to an embodiment disclosed herein.

The storage 220 may store diverse programs and data necessary for operations of the external device 200. To be specific, the storage 220 may store the data regarding the information on the external device 200 or contents including an image to be provided to the display device.

The processor 230 controls overall operations of the external device 200. To be specific, in response to the external device 200 being connected to the display device, the processor 230 may control the communicator 210 to transmit the information on the external device 200 to the display device. In response to the external device 200 being determined as the image source, the processor 230 may control the communicator 210 to transmit the data stored in the storage 220 to the display device.

Although not depicted, the external device 200 may further include a display, an input unit, or the like, needless to say.

As described above, as the information on the external device 200 is transmitted to the display device, and the plurality of display devices of the display system according to an embodiment disclosed herein share the information on the external device 200, the connection of the plurality of display devices does not need to be reset although the external device that performs as the image source is changed.

Figure 6:
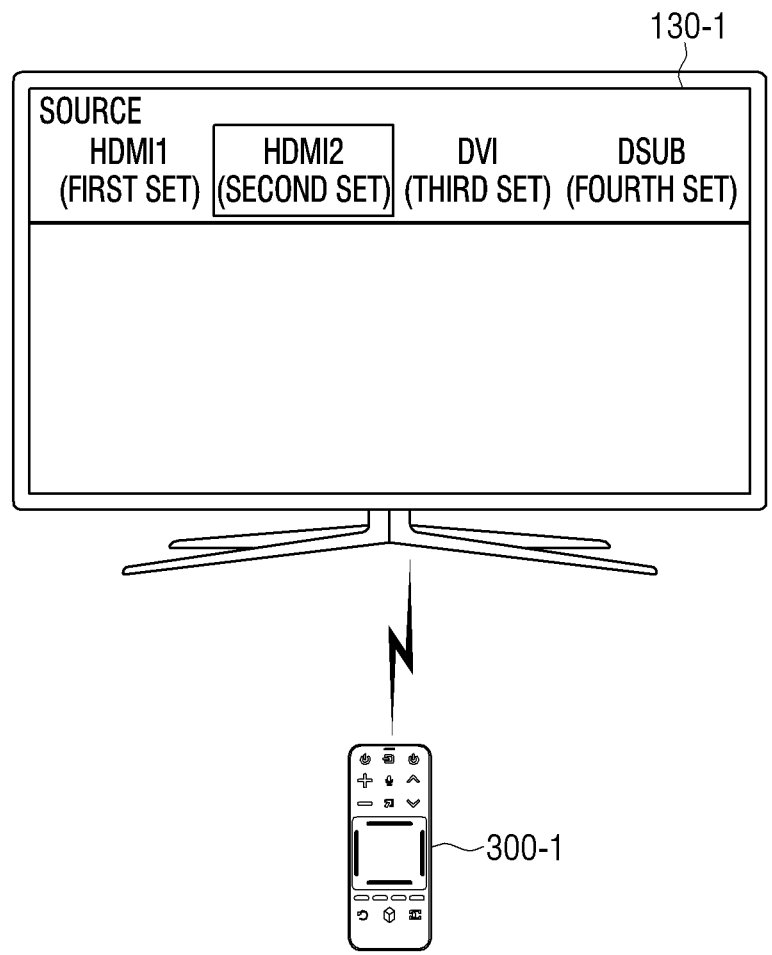
FIG. 6 is a diagram provided to describe a User Interface (UI) for selecting a display device connecting a data source.

FIG. 6 is a diagram provided to describe a User Interface (UI) for selecting a display device connecting an image source. To be specific, FIG. 6 illustrates an example where a user controls a display system according to an embodiment disclosed herein by using a first display device 100-1. The UI of FIG. 6 may be applied to second to fourth display devices 100-2 to 100-4 in the same manner.

Referring to FIG. 6, the first display device 100-1 may display a list of a plurality of selectable image sources connected to a plurality of display devices of the display system in a display 130-1.

To be specific, the list of the plurality of selectable image sources displayed in the display 130-1 may include a type of a connection port of the display device connecting the external device (HDMI, DSUB, DVI, or the like), information on a display device connected to each external device (a pre-assigned number, a model name, or resolution of the display device), a data transmission path designated according to an external device determined as an image source (the first set or the second set), or the like.

FIG. 6 illustrates an example where the display system includes four display devices, and each display device is connected to one external device. For example, the first display device 100-1 and the second display device may be connected to an HDMI port, the third display device may be connected to a DVI port, and the fourth display device may be connected to a DSUB port.

Although not depicted, the list of the plurality of selectable image sources displayed in the display 130-1 may include a type of the external devices connected to the respective display devices (a laptop PC, a smart phone, a set-top box, or the like), information including a model name of the external devices, a list of images that may be provided by the external devices, and so on.

A user may check the list of the selectable image sources displayed in the display 130-1 and select an external device to perform a function of an image source for providing an image. To be specific, the user may select an external device for providing data by using a remote control device, for example, a remote controller 300-1 for remotely controlling the first display device 100-1. In response to the display 130-1 being realized as a touch screen, the user may select an external device for providing data by touching the display 130-1 without any remote control device.

Accordingly, the connection of the plurality of display devices does not need to be reset although the external device for providing an image is changed, and only the data transmission path may be changed in the display system depending upon the external device for providing an image. By way of example, as illustrated in FIG. 6, in response to the user selecting the external device connected to the second display device as an image source by using the remote controller 300-1, the data transmitted from the external device connected to the second display device to the second display device may be sequentially transmitted to the third display device, the fourth display device, and the first display device and then sequentially transmitted again from the first display device to the second display device, the third display device, and the fourth display device, as the plurality of display devices are connected to each other in the form of the circular loop.

Figure 7:
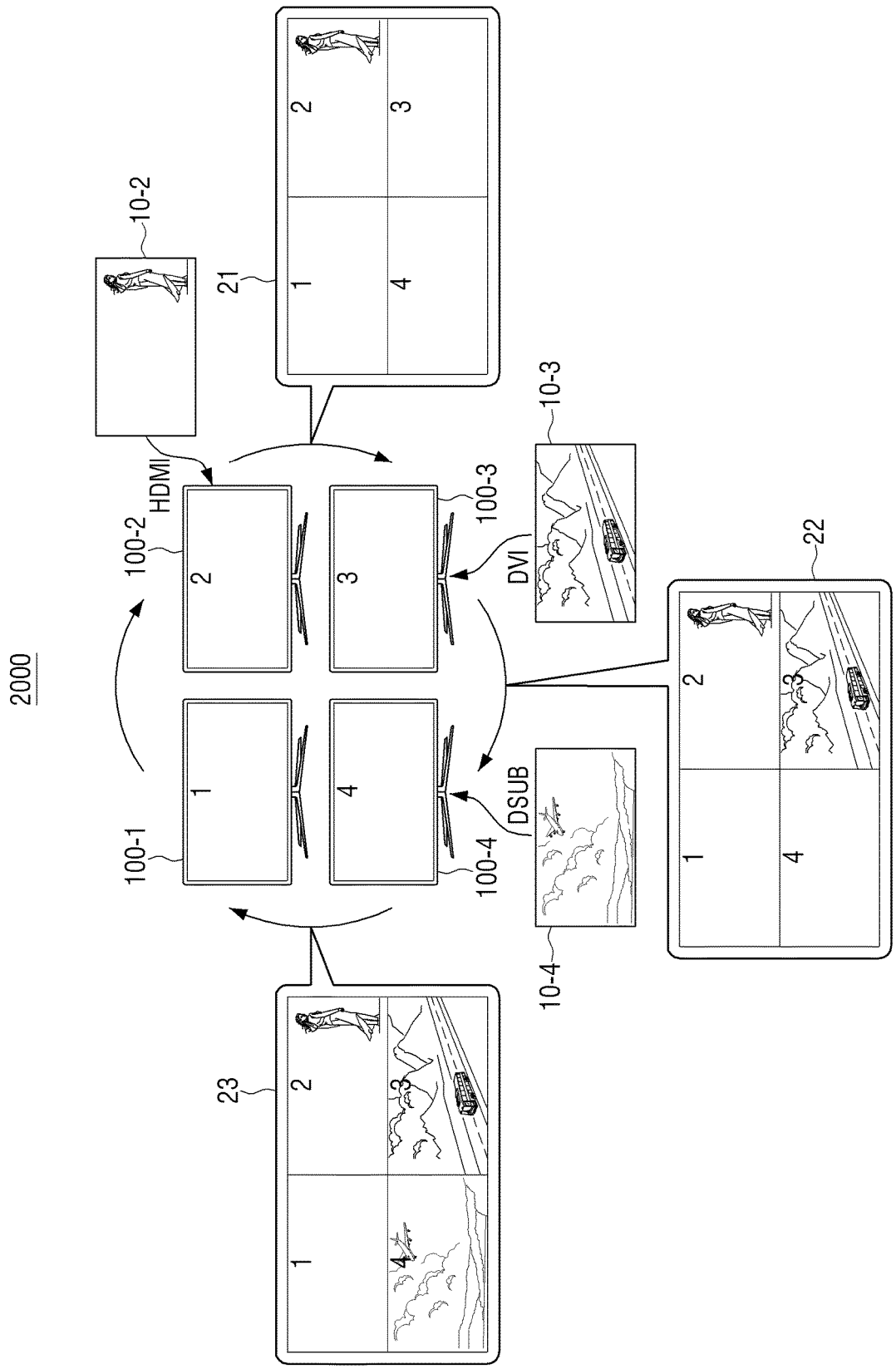
FIGS. 7 to 10 are diagrams provided to describe a display system that synthesizes images of a plurality of display devices according to another embodiment disclosed herein.

FIG. 7 is a diagram provided to describe a display system that synthesizes images of a plurality of display devices according to another embodiment disclosed herein. The display system according to another embodiment disclosed herein may include a plurality of display devices. The respective display devices may be connected to a plurality of external devices and receive images from the connected external devices.

Referring to FIG. 7, a display system 2000 according to another embodiment disclosed herein may include first to fourth display devices 100-1 to 100-4. The first to fourth display devices 100-1 to 100-4 may be connected to a plurality of external devices, respectively, to receive images corresponding to images 10-2 to 10-4 from the connected external devices. The display system 2000 may synthesize the images 10-2 to 10-4 received from the plurality of external devices and generate a synthesized image 23. The synthesized image 23 may be generated as the first frame of the images 10-2 to 10-4 received from the plurality of external devices. Further, the synthesized image 23 may be synthesized based on the positions of the plurality of display devices. In FIG. 7, the first to fourth display devices 100-1 to 100-4 are arranged in a form of 2×2, and thus, the synthesized image 23 may be displayed in a form of 2×2. In the following descriptions, it is assumed that transmission and reception of an image signifies transmission and reception of data corresponding to the image, for convenience in explanation.

To be specific, the first display device 100-1 is not connected to an external device or does not receive an image although being connected. Accordingly, a first image provided to the first display device 100-1 may be displayed as a black screen. The second display device 100-2 may receive the image 10-2 of the second external device from the external device connected to the second display device 100-2. The second display device 100-2 may arrange the received image 10-2 of the second external device in a right upper area corresponding to the position of the second display device 100-2 to generate a synthesized image 21. In this case, a left upper area corresponding to the position of the first display device 100-1 that did not receive an image and lower areas corresponding to the third and fourth display devices 100-3, 100-4 that have not yet received an image may be displayed as the black screens. Subsequently, the second display device 100-2 may transmit the synthesized image 21 to the third display device 100-3.

The third display device 100-3 may receive the image 10-3 of the third external device from the external device connected to the third display device 100-3. The third display device 100-3 may arrange the received image 10-3 of the third external device in a right lower area of the synthesized image 21 received from the second display device 100-2, the right lower area corresponding to the position of the third display device 100-3, to generate a synthesized image 22. Subsequently, the third display device 100-3 may transmit the synthesized image 22 to the fourth display device 100-4.

The fourth display device 100-4 may receive the image 10-4 of the fourth external device from the external device connected to the fourth display device 100-4. The fourth display device 100-4 may arrange the image 10-4 of the fourth external device in a left lower area of the synthesized image 22 received from the third display device 100-3, the left lower area corresponding to the position of the fourth display device 100-4, to generate the synthesized image 23. Subsequently, the fourth display device 100-4 may transmit the synthesized image 23 to the first display device 100-1. The synthesized image 23 may be sequentially transmitted from the first display device 100-1 to the second, third, and fourth display devices 100-2 to 100-4, and the synthesized image 23 may include all of the images 10-2 to 10-4 provided from the external devices connected to the first to fourth display devices 100-1 to 100-4.

As described above, as the display devices share the synthesized image generated by synthesizing the entire images provided from the plurality of external devices, the user may check the images provided from the external devices connected to the entire display devices of the display system 2000 in one display device.

In the above embodiment, the image provided from the external device connected to the first display device 100-1 is arranged first to generate a synthesized image, but this is an example for convenience in explanation. In the implementation, an image provided by any one of the external devices connected to the second to fourth display devices 100-2 to 100-4 may be arranged first to generate a synthesized image.

Figure 8:
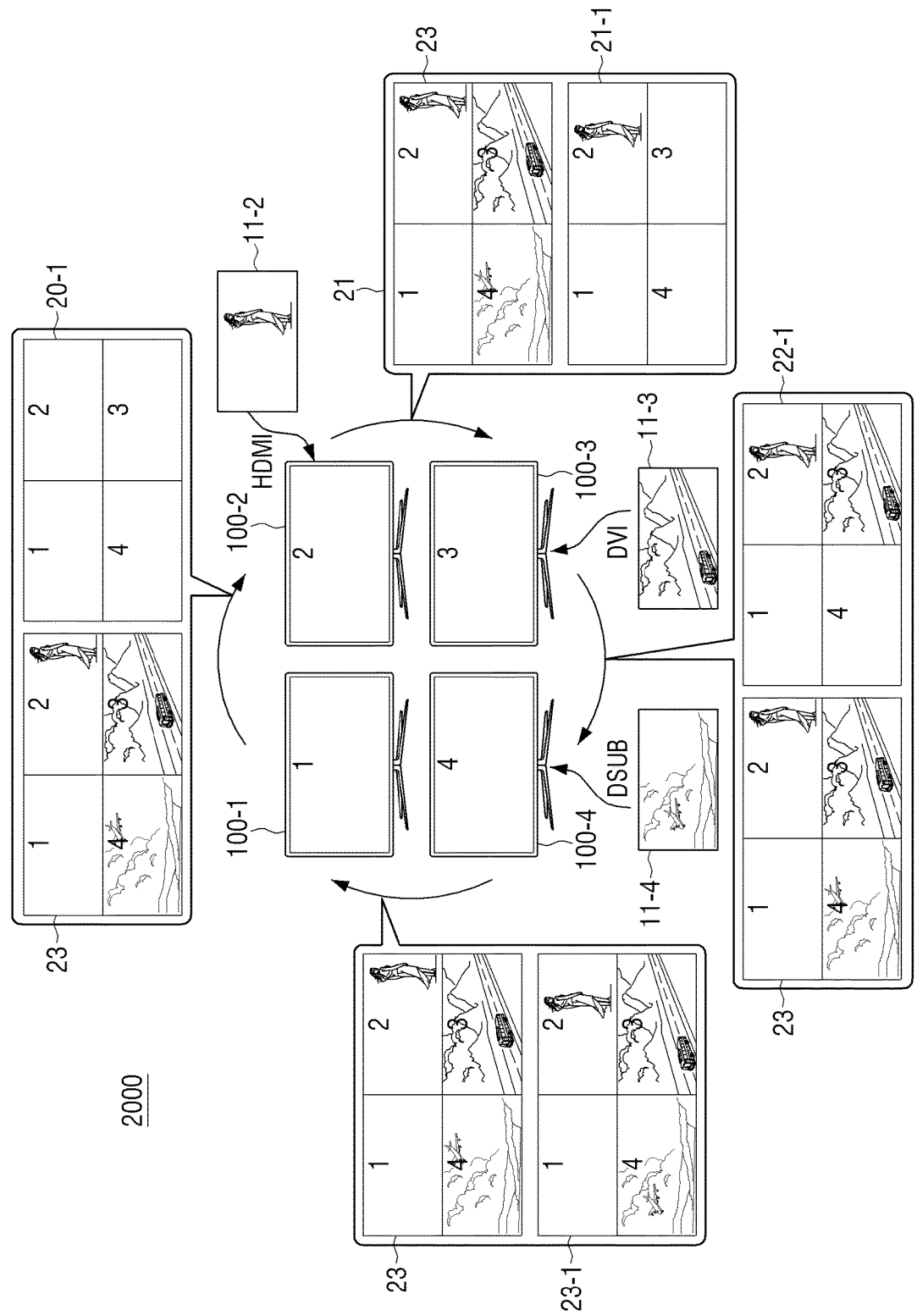

FIG. 8 is a diagram provided to specifically describe a display system that synthesizes images of a plurality of display devices and displays a synthesized image in the plurality of display devices, according to another embodiment of FIG. 7. The respective display devices may be connected to the plurality of external devices and receive the images from the connected external devices. Further, the respective display devices may be connected to other display device to transmit and/or receive a synthesized image and an image in a process of being synthesized.

Referring to FIG. 8, the display system 2000 according to another embodiment disclosed herein may sequentially transmit the synthesized image 23 from the first display device 100-1 to the second, third, and fourth display devices 100-2 to 100-4 according to the method described above in connection with FIG. 7. In this case, the synthesized image 23 may be the first frame of the images received from the plurality of external devices.

The display system 2000 may generate a synthesized image 23-1 by synthesizing the second frame of the images received from the plurality of external devices while transmitting the synthesized image 23 from the first display device 100-1 to the second, third, and fourth display devices 100-2 to 100-4 again.

To be specific, the first display device 100-1 may receive the synthesized image 23 from the fourth display device 100-4. The first display device 100-1 may transmit the received synthesized image 23 to the second display device 100-2. The first display device 100-1 is not connected to the external device or does not receive an image although being connected. Accordingly, in an image 20-1 synthesized as the second frame and transmitted with the image 23 synthesized as the first frame from the first display device 100-1 to the second display device 100-2, the areas corresponding to the first to fourth display devices 100-1 to 100-4 may be displayed as black or white screens.

The second display device 100-2 may receive the image 23 synthesized as the first frame and the image 20-1 synthesized as the second frame from the first display device 100-1. Further, the second display device 100-2 may receive an image 11-2 of the second external device from the external device connected to the second display device 100-2 and arrange the received image 11-2 of the second external device in a right upper area of the synthesized image 20-1 received from the first display device 100-1, the right upper area corresponding to the position of the second display device 100-2, to generate a synthesized image 21-1. In this case, a left upper area corresponding to the position of the first display device 100-1 that did not receive an image and the lower areas corresponding to the third and fourth display devices 100-3, 100-4 that have not yet received an image may be displayed as the black or white screens. Subsequently, the second display device 100-2 may transmit the synthesized image 21-1 to the third display device 100-3.

The third display device 100-3 may receive the image 23 synthesized as the first frame and receive the image 21-1 synthesized as the second frame from the second display device 100-2. Further, the third display device 100-3 may receive an image 11-3 of the third external device from the external device connected to the third display device 100-3 and arrange the received image 11-3 of the third external device in a right lower area of the synthesized image 21-1 received from the second display device 100-2, the right lower area corresponding to the position of the third display device 100-3, to generate a synthesized image 22-1. Subsequently, the third display device 100-3 may transmit the synthesized image 22-1 to the fourth display device 100-4.

The fourth display device 100-4 may receive the image 23 synthesized as the first frame and receive the image 22-1 synthesized as the second frame from the third display device 100-3. Further, the fourth display device 100-4 may receive an image 11-4 of the fourth external device from the external device connected to the fourth display device 100-4 and arrange the received image 11-4 of the fourth external device in a left lower area of the synthesized image 22-1 received from the third display device 100-3, the left lower area corresponding to the position of the fourth display device 100-4, to generate a synthesized image 23-1. Subsequently, the fourth display device 100-4 may transmit the synthesized image 23-1 to the first display device 100-1. The synthesized image 23-1 may be sequentially transmitted from the first display device 100-1 to the second, third, and fourth display devices 100-2 to 100-4. The synthesized image 23-1 may include all of the images 11-2 to 11-4 of the second to fourth external devices provided from the external devices connected to the first to fourth display devices 100-1 to 100-4.

The plurality of display devices of the display system 2000 may output a predetermined area of the image 23 synthesized as the first frame and received from other display device. In other words, when synthesizing an image as the first frame of the images received from the plurality of external devices, the plurality of display devices may do not output any image until the synthesized image 23 is completed. The plurality of display devices may transmit the image 23 synthesized as the first frame while synthesizing an image as the second frame and output the predetermined area of the synthesized image 23.

In response to the image 23-1 synthesized as the second frame being completed, the plurality of display devices may sequentially transmit the image 23-1 synthesized as the second frame while synthesizing an image as the third frame and output the predetermined area of the image 23-1 synthesized as the second frame.

As described above, as the plurality of display devices share the image generated by synthesizing all of the images provided from the plurality of external devices, the user may check the images provided from the external devices connected to the entire display devices of the display system 2000 in one display device.

In the above embodiment, the image provided from the external device connected to the first display device 100-1 is arranged first to generate a synthesized image, but this is an example for convenience in explanation. In the implementation, an image provided by any one of the external devices connected to the second to fourth display devices 100-2 to 100-4 may be arranged first to generate a synthesized image.

Hereinafter, an embodiment of outputting a synthesized image in a plurality of display devices is described more specifically.

Figure 9:
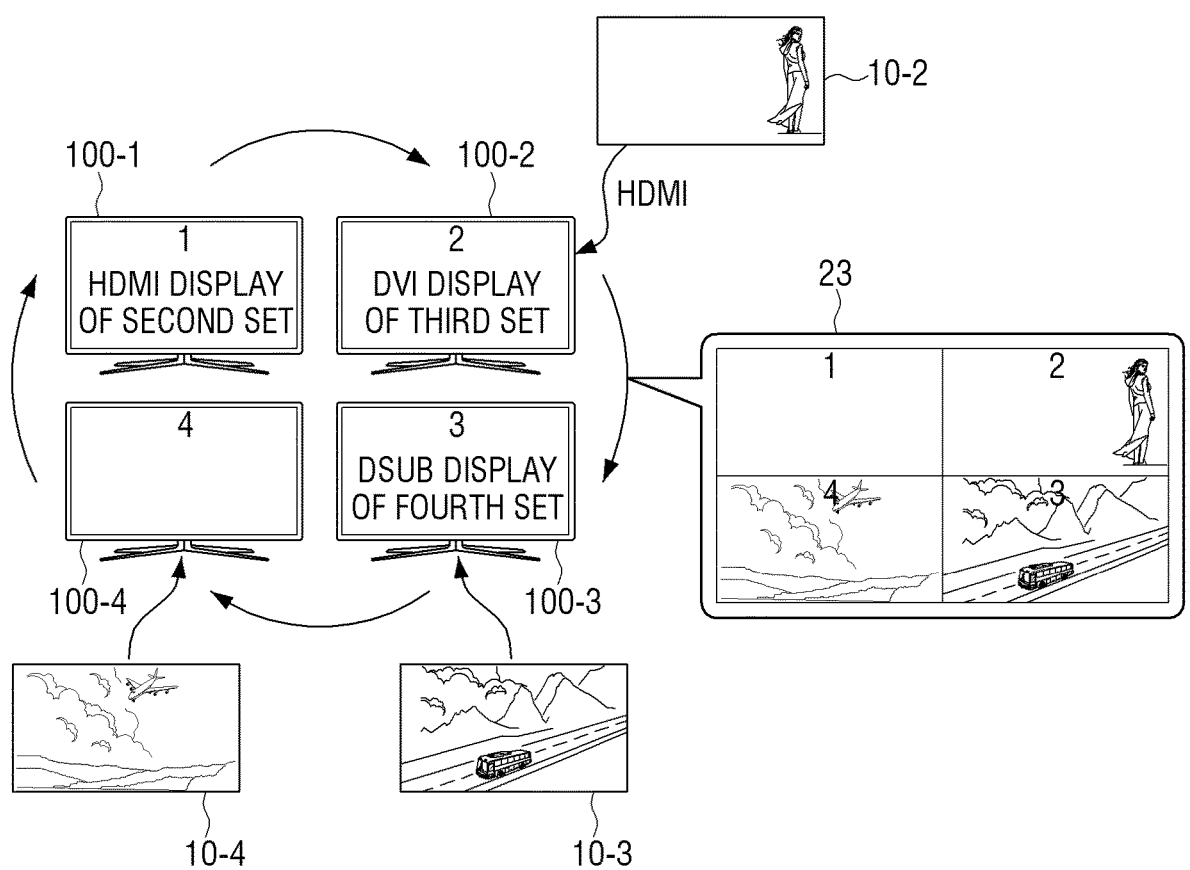

FIG. 9 is a diagram provided to describe a display system where one display device displays an image provided from an external device connected to other display device, according to another embodiment disclosed herein.

Referring to FIG. 9, the display system 2000 according to another embodiment disclosed herein may include the first to fourth display devices 100-1 to 100-4. The synthesized image 23 generated by including all of the images 10-2 to 10-4 of the second to fourth external devices provided from the external devices connected to the first to fourth display devices 100-1 to 100-4 may be sequentially transmitted from the first display device 100-1 to the second, third, and fourth display devices 100-2 to 100-4.

The first to fourth display devices 100-1 to 100-4 of the display system 2000 may display the images provided from the external devices connected to other display devices, respectively. To be specific, the user may set the first display device 100-1 to display the image 10-2 of the second external device provided from the external device connected to the second display device 100-2 through an HDMI port, set the second display device 100-2 to display the image 10-3 of the third external device provided from the external device connected to the third display device 100-3 through a DVI port, and set the third display device 100-3 to display the image 10-4 of the fourth external device provided from the external device connected to the fourth display device 100-4 through a DSUB port.

In the above embodiment, the user sets each display device so as to display the image provided from the external device connected to adjacent other display device, but this is an example. In the implementation, it is possible to set each display device so as to display the image provided from the external device connected to other display device regardless of adjacency.

Figure 10:
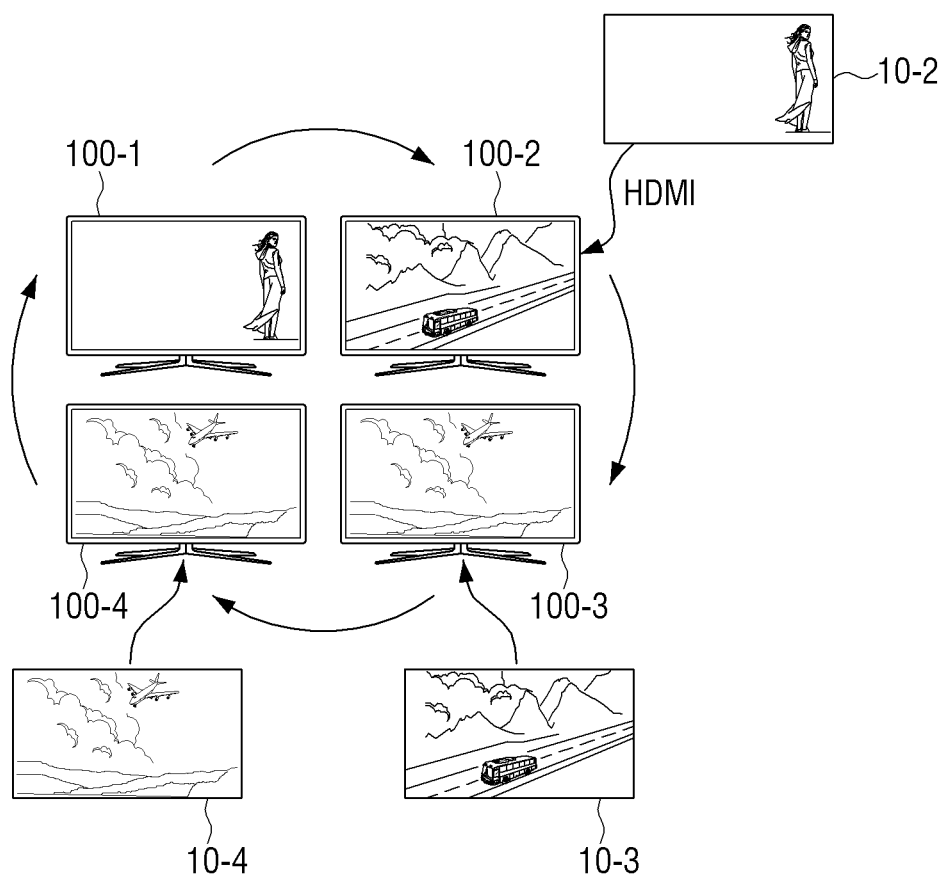

FIG. 10 is a diagram illustrating display devices that display an image provided from an external device connected to other display device according to a setting of each display device as illustrated in FIG. 8.

Referring to FIG. 10, according to another embodiment disclosed herein, the first display device 100-1 of the display system 2000 may display the image 10-2 of the second external device provided from the external device connected to the second display device 100-2 through the HDMI port, the second display device 100-2 may display the image 10-3 of the third external device provided from the external device connected to the third display device 100-3 through the DVI port, and the third display device 100-3 may display the image 10-4 of the fourth external device provided from the external device connected to the fourth display device 100-4 through the DSUB port, according to user's setting.

In this case, there is not any particular setting for the fourth display device 100-4, and thus, the fourth display device 100-4 may display the image 10-4 of the fourth external device provided from the external device connected to the fourth display device 100-4. Meanwhile, in the above embodiment, the respective display devices display an image provided from an external device connected to one display device when there is not any particular setting where one display device displays an image provided from an external device connected to other display device. However, in the implementation, the display devices may be realized so as to display a black screen with no image or display the synthesized image 23.

As described above, the display system may synthesize the plurality of images provided from the plurality of external devices respectively connected to the plurality of display devices of the display system 2000 and display the images provided from the external device connected to other display device by using the synthesized image.

Figure 11:
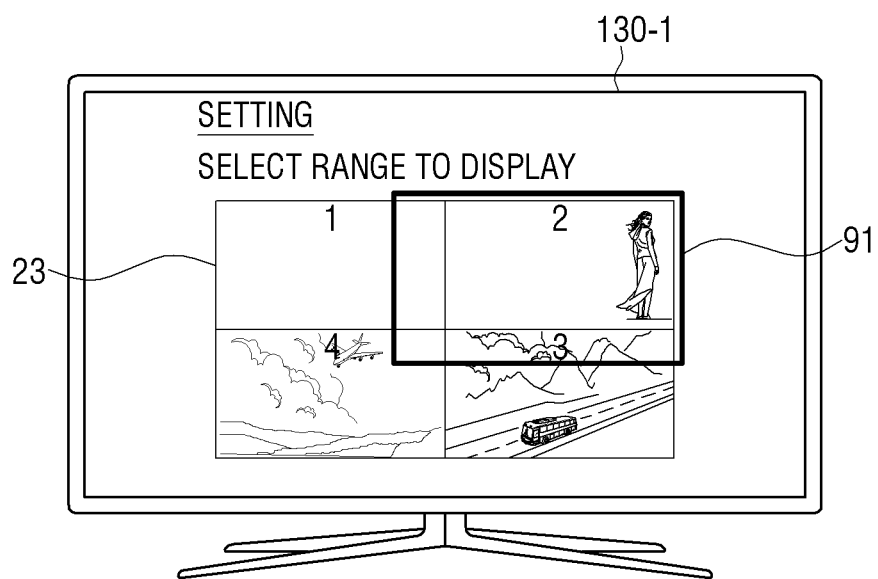
FIG. 11 is a diagram provided to describe a UI for selecting a range to be displayed out of a synthesized image according to another embodiment disclosed herein.

FIG. 11 is a diagram provided to describe a User Interface (UI) for selecting a range to be displayed out of a synthesized image according to another embodiment disclosed herein. To be specific, FIG. 11 is provided to describe an example where a user controls a display system according to an embodiment disclosed herein by using a first display device 100-1. The UI of FIG. 11 may be also applied to second to fourth display devices 100-2 to 100-4, needless to say.

Referring to FIG. 11, the first display device 100-1 may display a synthesized image 23 in a display 130-1 in order to select a range to be displayed in the display 130-1.

Although not depicted, the user may select a range 91 to be displayed in the display 130-1 by using a remote controller for remotely controlling the first display device 100-1. To be specific, the user may set the first display device 100-1 to display only an image provided from any one of a plurality of external devices out of the synthesized image 23 or designate an area to be displayed in the display 130-1 out of the synthesized image 23. By way of example, the user may set the first display device 100-1 to display the second image along with a part of the images of the first, third, and fourth external devices adjacent to the image of the second external device, out of the synthesized image 23.

In response to the display 130-1 being realized as a touch screen, the user may select a range to be displayed by touching the display 130-1 without a remote control device.

In the above embodiment, the user selects an image to be displayed in the display 130-1 of the first display device 100-1, but this is an example. In the implementation, the user may select an image to be displayed in the display of the second to fourth display devices by using the display 130-1 of the first display device 100-1.

Figure 12:
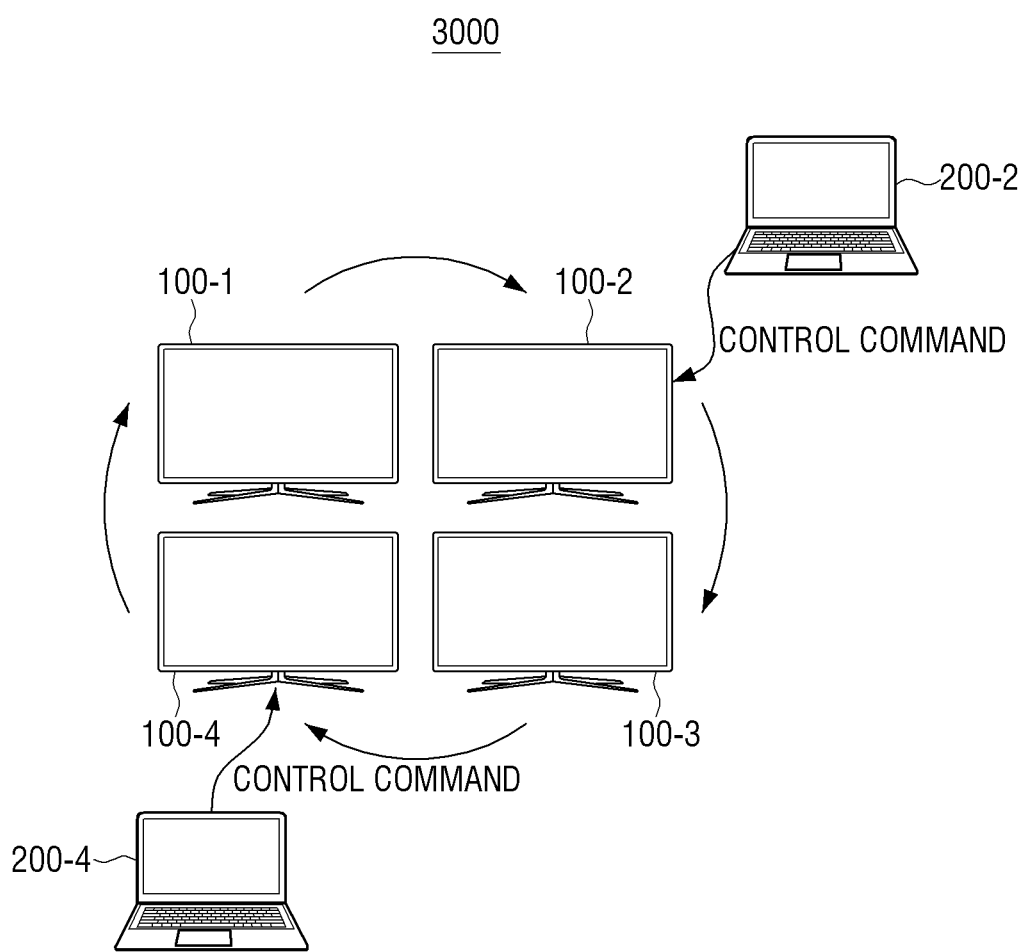
FIG. 12 is a diagram provided to describe a display system where a control command is included in data provided from a data source according to another embodiment disclosed herein.

FIG. 12 is a diagram provided to describe a display system where a control command is included in data provided from an image source, and an image and the control command are transmitted together, according to another embodiment disclosed herein.

Referring to FIG. 12, a display system 3000 according to another embodiment disclosed herein may include first to fourth display devices 100-1 to 100-4, a second external device 200-2 connected to the second display device 100-2, and a fourth external device 200-4 connected to a fourth display device 100-4.

The first to fourth display devices 100-1 to 100-4 may share information on the second external device 200-2 and the fourth external device 200-4. The operation of sharing the information on the external devices is the same as the operation described above in connection with FIG. 2 and FIG. 3, and thus, a repeated description is omitted.

The data provided from at least one of the connected second external device 200-2 and fourth external device 200-4 may include a control command for controlling at least one of the first to fourth display devices 100-1 to 100-4. The first to fourth display devices 100-1 to 100-4 may share the data including the control command.

In the above embodiment, only the second display device 100-2 and the fourth display device 100-4 are connected to the external devices, but this is an example. In the implementation, all of the plurality of display devices of the display system 3000 may be connected to one or more external devices.

As described above, as the control command for controlling at least one of the plurality of display devices is included in the data provided from the external device connected to the display device and transmitted along with an image, it is possible to control other display devices of the display system more efficiently.

Figure 13:
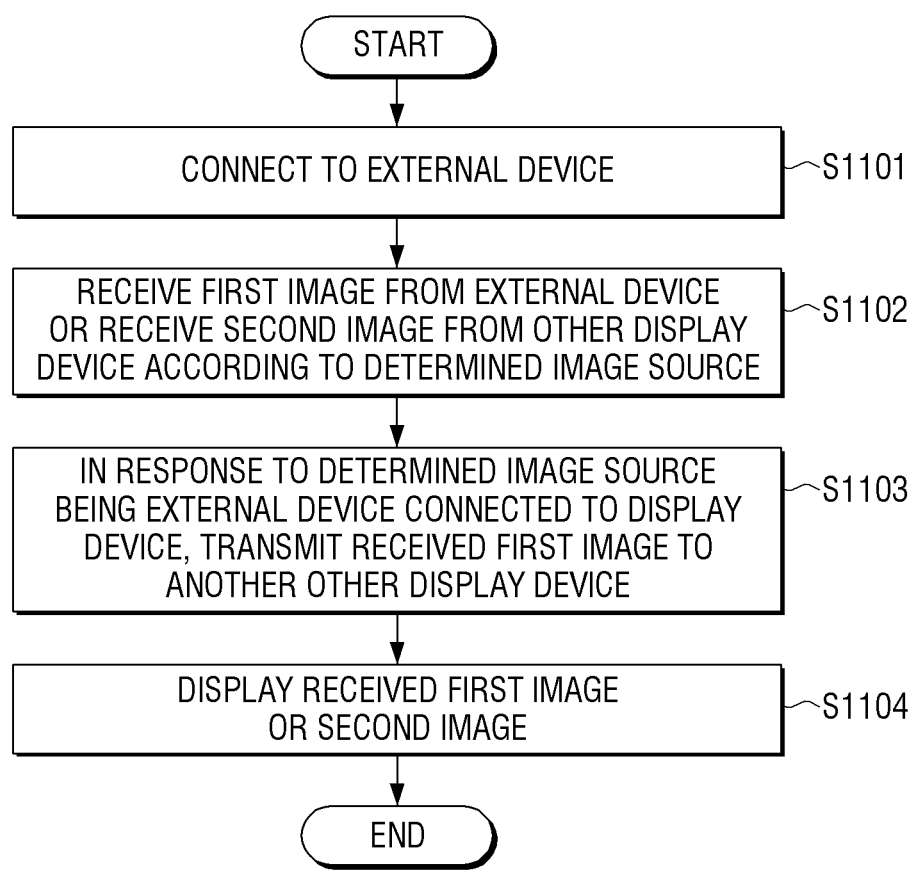
FIGS. 13 and 14 are flowcharts provided to describe a method for controlling a display device of a display system according to an embodiment disclosed herein.

FIG. 13 is a flowchart provided to describe a method for controlling a display device of a display system according to an embodiment disclosed herein.

Referring to FIG. 13, a display device may be connected to an external device (S1101). To be specific, the display device may be connected to the external device in a wired manner of using a connection port of the display device or in a wireless manner.

The display device may receive a first image from the external device or receive a second image from other display device according to a determined image source (S1102). In this case, the display device may form a closed-loop with a plurality of other display devices, and the plurality of other display devices may be connected to a plurality of external devices, respectively.

To be specific, in response to the determined image source being the external device connected to the display device, the display device may receive an image from the external device. In the following description, the image received from the external device is called 'first image' for convenience in explanation. In response to the determined image source being an external device connected to other display device, the display device may receive an image from the other display device. In this case, the image received from the other display device was provided from an external device connected to the other display device. In the following description, the image received from the other display device is called 'second image' for convenience in explanation. A user may select an image source for the image to be displayed in a display from a list of a plurality of selectable image sources or determine an external device used by the user as the image source for the image to be displayed in the display.

In response to the determined image source being the external device connected to the display device, the display device may transmit the received first image to another other display device (S1103). To be specific, in response to the external device connected to the display device being determined as the image source, the display device is a host device that is a starting point of data transmission. Accordingly, the display device may transmit the second image to another other display device different from other display device that transmits the second image so that the image is transmitted to the plurality of other display devices sequentially.

Although not depicted, in response to the determined image source being the external device connected to other display device, the display device may transmit the received second image to another other display device according to a position of the display device in the plurality of display devices. To be specific, in response to the determined image source being the external device connected to other display device, and the display device not being arranged as the last in the order for transmitting the second image, the display device may transmit the received second image to another other display device. In response to the display device being arranged as the last in the order for transmitting the second image, the display device may do not transmit the received second image to other display device.

Subsequently, the display device may display the received first image or second image (S1104). To be specific, the display device may display the first image or second image according to the determined image source. For example, in response to the determined image source being the external device connected to the display device, the display device may display the first image received from the external device. Inn response to the determined image source being the external device connected to other display device, the display device may display the second image received from other display device.

As described above, a display device of the display system may receive and display an image from an external device connected to the display device or the external device connected to other display device without resetting the connection of the plurality of display devices of the display system.

Figure 14:
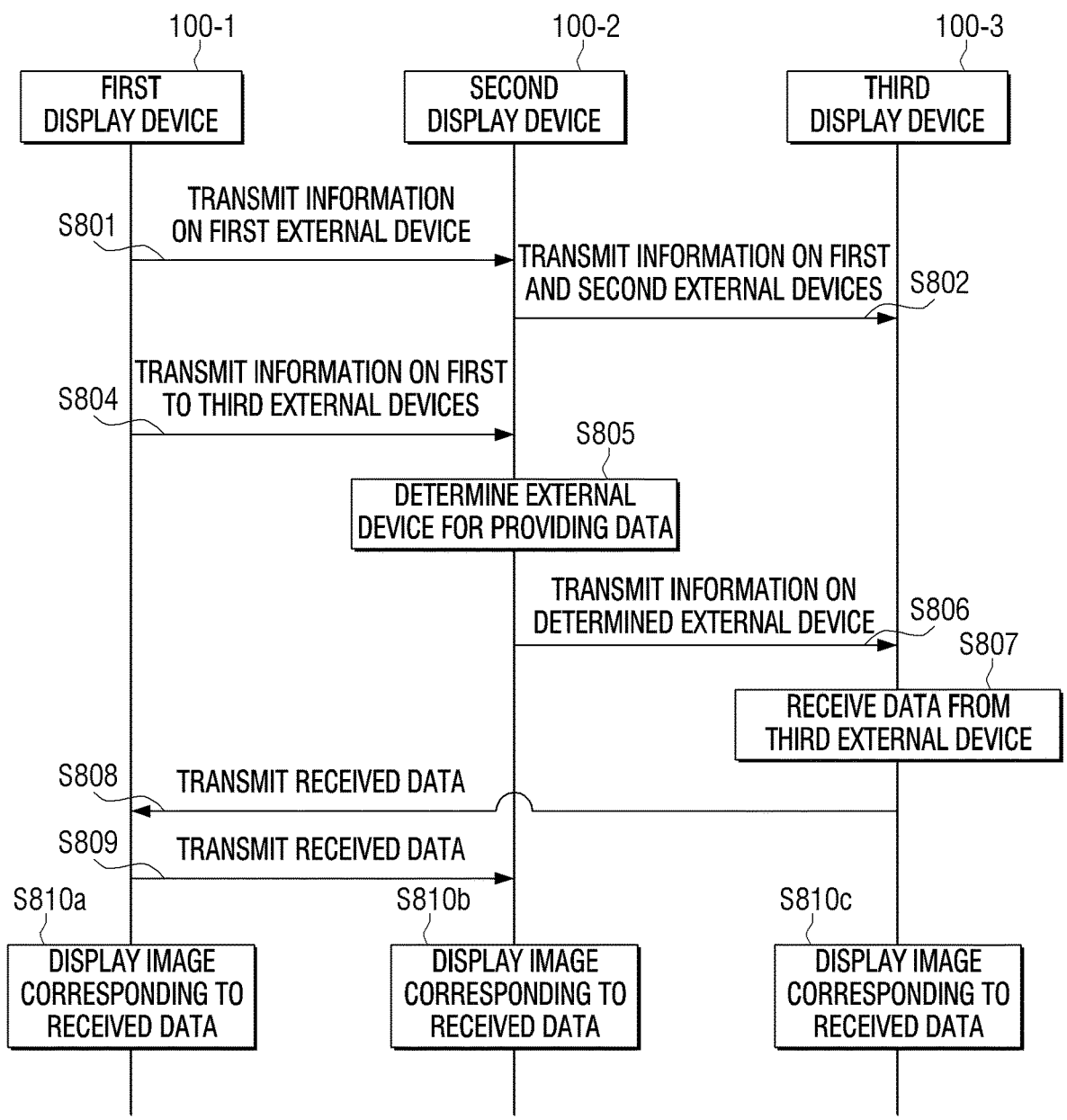

FIG. 14 is a flowchart provided to describe a method for controlling a display device of a display system according to an embodiment disclosed herein.

Referring to FIG. 14, a display system according to an embodiment disclosed herein may include a first display device 100-1, a second display device 100-2, and a third display device 100-3, but this is an example for convenience in explanation, and the display system may include two or more or four or more display devices. The plurality of display devices of the display system according to an embodiment disclosed herein are connected in a form of a closed-loop. However, in the following description, it is assumed that the first display device 100-1 is a staring point of data transmission, and a user controls the display system by using the second display device 100-2, for convenience in explanation.

The first display device 100-1 may transmit information on a connected first external device to the second display device 100-2 (S801). The second display device 100-2 connected to a second external device may transmit the received information on the first external device and information on the connected second external device to the third display device 100-3 (S802). The third display device 100-3 connected to a third external device may transmit the received information on the first and second external devices and information on the connected third external device to the first display device 100-1 (S803). The first display device 100-1 may transmit the received information on the first to third external devices to the second display device 100-2. As described above, the information on the first to third external devices respectively connected to the first to third display devices 100-1 to 100-3 is transmitted in the order of the first, second, and third display devices 100-1 to 100-3 and then transmitted again in the order. Accordingly, the information on the first to third external devices moves in a closed-loop of the first, second, and third display devices 100-1 to 100-3, and thus, the first to third display devices 100-1 to 100-3 may share the information on the external devices.

In this embodiment, the user controls the display system by using the second display device 100-2. Accordingly, in response to the information on the first to third external devices being received by the second display device 100-2, the user may determine an external device for providing an image (S805). In this case, the external device for providing an image may be an image source for an image to be displayed in the display device. Further, the second display device 100-2 may display a list of the received information on the first to third external devices and receive a selection of an image source from the user. Accordingly, the second display device 100-2 may determine the image source selected by the user as an image source for an image to be displayed in the display device.

In the above embodiment, the user controls the display system by using the second display device 100-2, but this is an example. In response to the display system being realized so as to be controlled by the third display device 100-3, the method may further include an operation of transmitting the information on the first to third external devices from the second display device 100-2 to the third display device 100-3.

The second display device 100-2 may transmit the information on the determined external device to the third display device 100-3 (S806). As an example, the determined image source may be the third external device connected to the third display device 100-3 selected by the user.

In response to the third display device 100-3 receiving the information on the image source determined as the third external device, the third display device 100-3 may receive an image from the third external device (S807). In this case, the data that the third display device 100-3 receives from the third external device may be an image to be displayed. In the above embodiment, the third external device is determined as the image source, but this is an example. In response to the first or second external device being determined as the image source, the method may further include at least one of an operation of transmitting the information on the external device determined as the image source from the third display device 100-3 to the first display device 100-1 and an operation of sequentially transmitting the information on the determined external device from the first display device 100-1 to the second display device 100-2.

The third display device 100-3 may transmit the received data to other display device so that the image is displayed in other display device. To be specific, the third display device 100-3 may transmit the received data to the first display device 100-1 (S808). The first display device 100-1 may transmit the received data to the second display device 100-2 sequentially (S809). As the data is transmitted in a predetermined order in the closed-loop of the plurality of display devices, the plurality of display devices may share the image to be displayed.

The first to third display devices 100-1 to 100-3 may display the received image, respectively (S810a, S810b, S810c). In the above embodiment, the plurality of display devices display the same image, but this is an example. In the implementation, the display devices may display only a predetermined area of an image corresponding to a predetermined position of each display device while sharing the same data or display an image generated by synthesizing the images provided from the external devices or a selected area of the synthesized image.

As described above, according to various embodiments disclosed herein, it is possible to change an external device that performs a function of an image source for providing an image without resetting the connection of the plurality of display devices. That is, the display device may use an external device connected to other display device as the image source, and thus, the display device may receive images from external devices more than the number of the provided connection ports.

According to various embodiments disclosed herein, the meted for displaying a content of a display device of a display system consisting of a plurality of display devices may be stored in a non-transitory readable medium. The non-transitory readable medium may be stored and used in diverse devices.

The non-transitory readable medium refers to a machine-readable medium that stores data permanently or semi-permanently unlike a register, a cache, or a memory that stores data for a short time. Particularly, the above-described various applications and programs may be stored in and provided through the non-transitory readable medium, such as, a Compact Disc (CD), a Digital Versatile Disk (DVD), a hard disk, a Blu-ray disk, a Universal Serial Bus (USB), a memory card, a Read-Only Memory (ROM), or the like.

Accordingly, the above-described program may be installed in the conventional display device, and it is possible to realize a display system consisting of display devices capable of performing functions of both of a host device and a slave device.

As above, a few embodiments have been shown and described. The foregoing embodiments and advantages are merely exemplary and are not to be construed as limiting the present inventive concept. The present teaching can be readily applied to other types of devices. Also, the description of the embodiments is intended to be illustrative, and not to limit the scope of the claims, and many alternatives, modifications, and variations will be apparent to a person having ordinary skill in the art.

What is claimed is:

1. A display device comprising:
    a display;
    a communicator configured to communicate with a first external device, a first nearby display device connected to a second external device, and a second nearby device connected to a third external device; and
    a processor configured to:
        control the communicator to transmit a first image received from the first external device and a second image received from the first nearby display device to the second nearby display device,
        control the communicator to receive first device information on the first external device from the first external device, to receive second device information on the second external device corresponding to the second image from the first nearby display device, and to receive third device information on the third external device from the first nearby display device,
        generate an image source list using the first, the second, and the third device information, and control the display to display the generated image source list, and
        in response to receiving a control command to select one from among the first, the second, and the third external device as an image source, control the display to display an image corresponding to the selected external device.

2. The device as claimed in claim 1, wherein the processor controls the display to display a predetermined area out of the received first image or second image based on a position of the display device, the first nearby display device and the second nearby display device.

3. The device as claimed in claim 1, wherein the processor is configured to:
    generate a synthesized image by combining the first image and the second image based on a position of the display device, the first nearby device, and the second nearby device, wherein each area in which the first image and the second image respectively included in the synthesized image, corresponds to each position of the display device and the first nearby device among the display device, the first nearby device and the second nearby device, and
    based on receiving a control command to select a part of an area which is to be displayed in the display from the synthesized image, control the display to display only a part of an area corresponding to the control command from the synthesized image.

4. The device as claimed in claim 1, wherein the communicator receives, from the first nearby display device, a control command regarding the display device,
    wherein the processor performs an operation corresponding to the received control command.

5. The device as claimed in claim 1, wherein the communicator receives, from the first nearby display device, a control command regarding the second nearby display device, and the processor controls the communicator to transmit the received control command regarding the second nearby device to the second nearby display device.

6. A control method of a display device, the method comprising:
    connecting with a first external device;
    connecting with a first nearby display device connected to a second external device and a second nearby display device connected to a third external device;
    transmitting a first image received from the first external device and a second image received from the first nearby display device to the second nearby display device;
    receiving first device information on the first external device from the first external device, receiving second device information on the second external device corresponding to the second image from the first nearby display device, and receiving third device information on the third external device from the first nearby display device,
    generating an image source list using the first, the second, and the third device information, and displaying the generated image source list, and
    in response to receiving a control command to select one from among the first, the second, and the third external device as an image source, displaying an image corresponding to the selected external device.

7. The method according to claim 6, wherein the displaying comprises displaying a predetermined area out of the received first image or second image based on a position of the display device, the first nearby display device and the second nearby display device.

8. The method according to claim 6, further comprising:
receiving a control command to select a part of an area which is to be displayed in the display device from the synthesized image,
wherein the displaying comprises displaying only a part of an area corresponding to the control command from the synthesized image.

9. The method according to claim 6, further comprising:
receiving, from the first nearby display device, a control command regarding the display device; and
performing an operation corresponding to the received control command.

10. The method according to claim 6, further comprising:
receiving, from the first nearby display device, a control command regarding the second nearby display device; and
transmitting the received control command regarding the second nearby display device to the second nearby display device.

11. A display system comprising:
a plurality of external devices which store content, and comprising a first external device, a second external device, and a third external device; and
a plurality of display devices comprising a first display device, a second display device, and a third display device respectively connected to the first external device, the second external device, and the third external device,
wherein the first display device which directly receives a first image corresponding to a content stored in the first external device transmits each of the received first image and a second image received from a second display device connected to the second external device to the third display device connected to the third external device, and displays at least one of the first image and the second image, and
wherein the first display device is configured to:
receive first device information on the first external device from the first display device, receive second device information on the second external device corresponding to the second image from the second display device, and receive third device information on the third external device from the second display device,
generate an image source list using the first, the second, and the third device information, and display the generated image source list, and
in response to receiving a control command to select one from among the first, the second, and the third external device as an image source, displaying an image corresponding to the selected external device.

12. The display system according to claim 11, wherein each of the plurality of display devices is connected to each of two adjacent other devices via wired cable.

* * * * *